Feb. 23, 1954

D. M. LENTZ 2,669,876

TIRE PRESSURE INDICATING AND RECORDING DEVICE

Filed July 15, 1950

INVENTOR.
DAVID M. LENTZ

BY *Hudson, Boughton,
Williams, David & Hoffmann*
ATTORNEYS

Feb. 23, 1954     D. M. LENTZ     2,669,876
TIRE PRESSURE INDICATING AND RECORDING DEVICE
Filed July 15, 1950     4 Sheets-Sheet 2

INVENTOR.
DAVID M. LENTZ
BY Hudson, Boughton,
Williams, David & Hoffmann
ATTORNEYS Feb. 23, 1954          D. M. LENTZ          2,669,876

TIRE PRESSURE INDICATING AND RECORDING DEVICE

Filed July 15, 1950          4 Sheets-Sheet 3

INVENTOR.

DAVID M. LENTZ

BY *Hudson, Boughton,*
*Williams, David & Hoffmann*

ATTORNEYS

Feb. 23, 1954

D. M. LENTZ 2,669,876

TIRE PRESSURE INDICATING AND RECORDING DEVICE

Filed July 15, 1950

INVENTOR.
DAVID M. LENTZ
BY Hudson, Boughton,
Williams, David & Hoffmann
ATTORNEYS Patented Feb. 23, 1954

2,669,876

UNITED STATES PATENT OFFICE 2,669,876

TIRE PRESSURE INDICATING AND RECORDING DEVICE

David M. Lentz, Maple Heights, Ohio, assignor to Edward K. Brown, Shaker Heights, Ohio, as trustee Application July 15, 1950, Serial No. 174,046

9 Claims. (Cl. 73—390)

The present invention relates to apparatus for indicating and/or recording fluid pressures, particularly in environments in which it is desirable to have a warning of pressure variations from a predetermined range, such as in the air pressure of vehicle tires. The present application is a continuation-in-part of my now abandoned U. S. application Serial No. 778,869, filed October 9, 1947, for "Tire Pressure Alarm and Indicating Device."

An object of the present invention is the provision of a fluid pressure indicating apparatus having a warning signal operative when the fluid pressure deviates from a predetermined range and an indicating mechanism adapted to indicate the exact fluid pressure outside of the predetermined range.

A further object of the invention is the provision of a fluid pressure indicating system having a warning signal which is operative when the pressures in one or more of a plurality of fluid pressure containers, such as the tires of a vehicle, deviate from normal.

A further object of the present invention is the provision of a fluid pressure indicating system for indicating pressures in a plurality of fluid containers, which system includes a fluid pressure indicating device and a warning signal, which signal is operative to indicate abnormal fluid pressures in any of the containers, and the indicating device being adapted to selectively indicate the pressure in the individual containers.

Another object of the invention is the provision of a new and improved fluid pressure indicating system comprising a device for printing a record of the fluid pressures in one or more containers, a dial indicator for selectively indicating the pressures in one or more of the containers, and a warning signal operative when the fluid pressure in any of one or more containers deviates from a predetermined range.

Other objects and advantages of the invention will be apparent from the following description of preferred forms of the invention, reference being had to the accompanying drawings, wherein.

Figure 12:
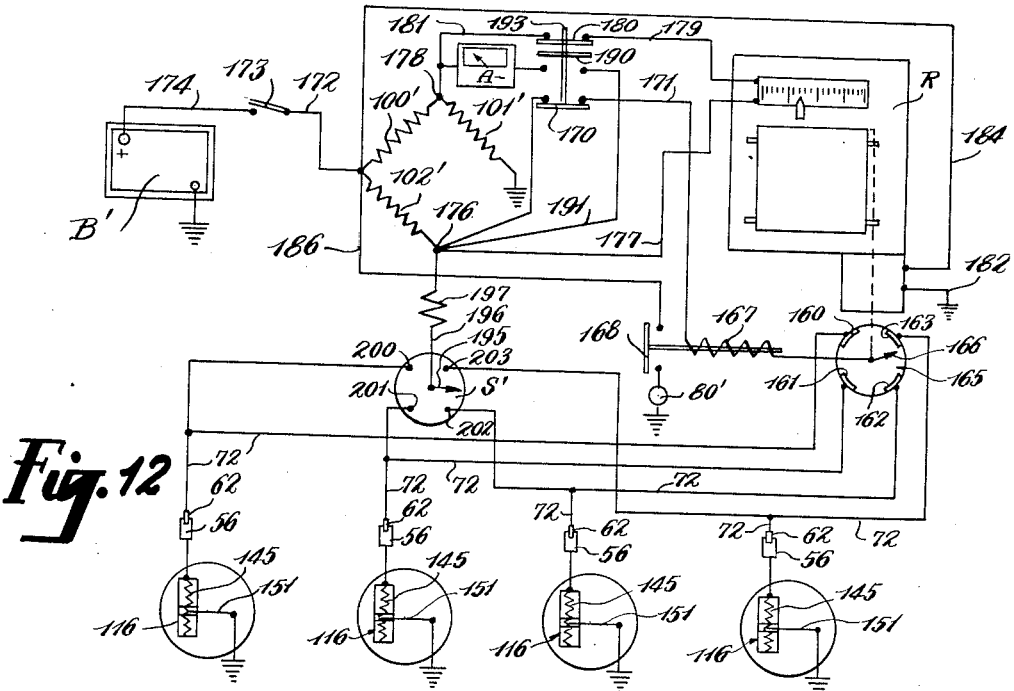
Figure 13:
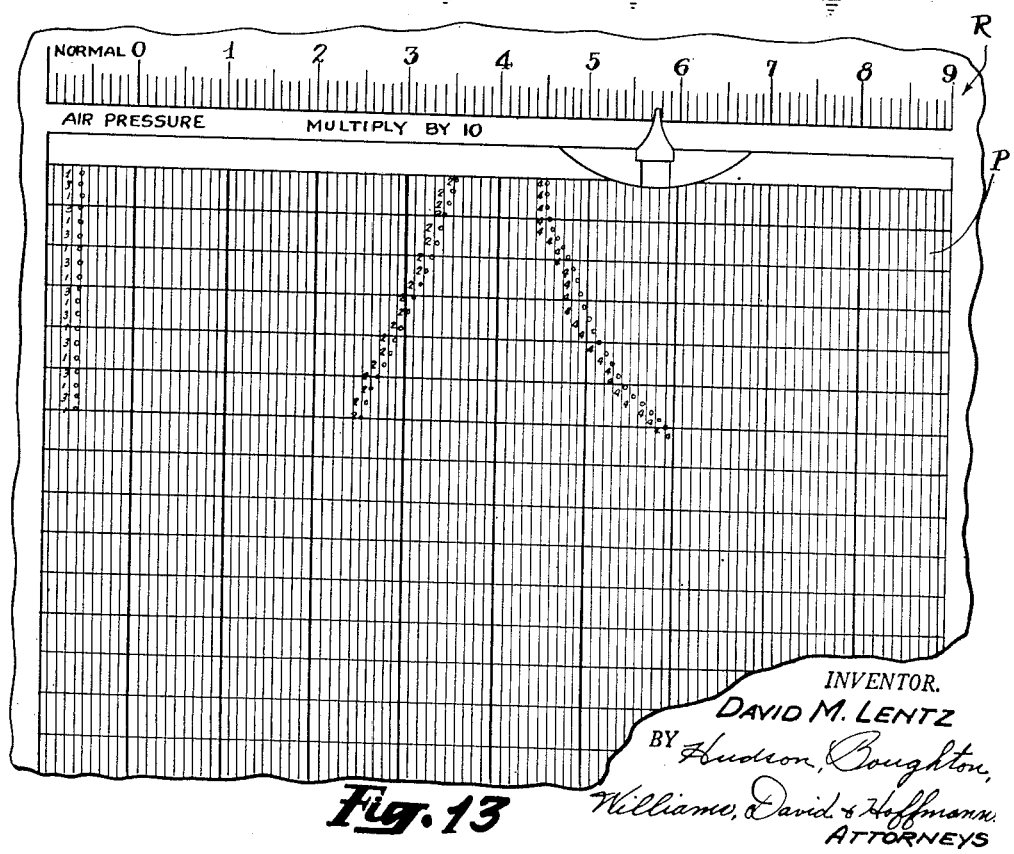

Fig. 12 is a wiring diagram of mechanism for producing a warning signal in the event of an abnormal air pressure in any one of a plurality of vehicle tires and having indicating means to provide a printed record of air pressures existing in the individual tires from time to time and a dial indicator to register the exact abnormal pressure in any selected tire; and Fig. 13 is a fragmentary elevational view of a recorder which is shown diagrammatically in Fig. 12.

The invention contemplates the provision of a pressure responsive variable resistance device adapted to respond to fluid pressures such as the air pressures in individual tires of a vehicle. The resistance device includes a contact movable over a suitable resistance coil by a pressure responsive device actuated by the fluid pressure, and a portion of the resistance coil in the path of the contact is insulated from the movable contact, or otherwise blocked therefrom, whereby the contact makes electrical connection with the coil only when the fluid pressure is above or below a predetermined or normal range. The resistance coil is connected in an electric circuit which includes an electric signal device and is capable of energizing the signal so that in the event there is abnormal fluid pressure the signal is energized. A current responsive indicator, preferably of the Wheatstone bridge type, is adapted to be selectively connected in the resistance circuit and which registers such current in appropriate terms, such as pounds per square inch of fluid pressure in the pressure responsive devices. The indicating system is particularly suitable for indicating the pressures in a plurality of fluid containers and in that event a pressure responsive resistance device is connected with the individual containers and the signal is in parallel circuit with the resistances so that variation of fluid pressure from a predetermined range in any of the containers results in operation of the signal. The indicator is adapted to be selectively connected with any one of the pressure responsive resistances to indicate the individual pressures.

In one form of the invention, a recording device responsive to the current in the resistance circuit or circuits is provided which prints a record of the fluid pressures at frequent intervals and, preferably, a signal device is provided in conjunction with the recorder to indicate abnormal fluid pressures according to current values in the resistance circuit or circuits. Also, the recorder may be temporarily disconnected from the resistance circuit or circuits and a dial type indicator selectively connected with the individual circuit or circuits to secure a reading of the exact abnormal fluid pressures.

Referring now to the drawings, one form of the invention is shown in Figs. 1 through 7 and it comprises a mechanism for indicating the air pressures in four pneumatic tires of a vehicle, although it is to be understood that the mechanism could be used in connection with other forms of fluid containers or with more or fewer tires or containers, if desired.

Figure 1:
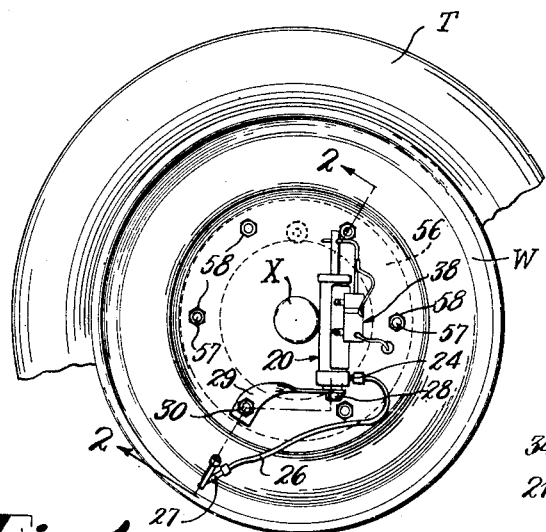
Fig. 1 is an elevational view of a vehicle wheel with one form of an air pressure responsive electrical resistance device attached thereto.
Figure 2:
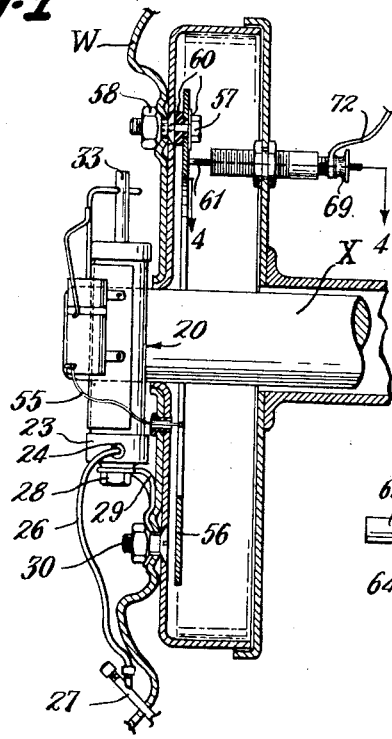
Fig. 2 is a sectional view taken substantially along line 2—2 of Fig. 1.
Figure 3:
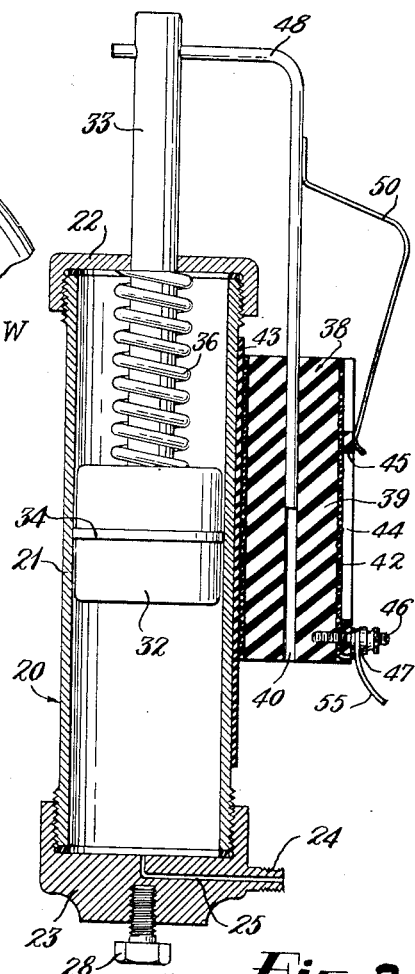
Fig. 3 is a sectional view of the electrical resistance device.
Figure 4:
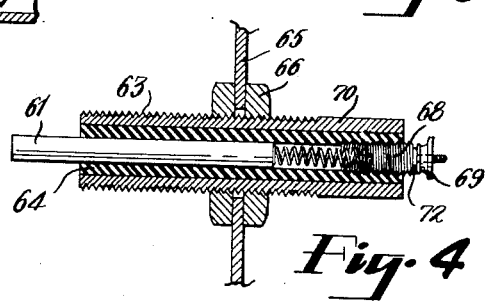
Fig. 4 is a sectional view taken substantially on line 4—4 of Fig. 2.
Figure 5:
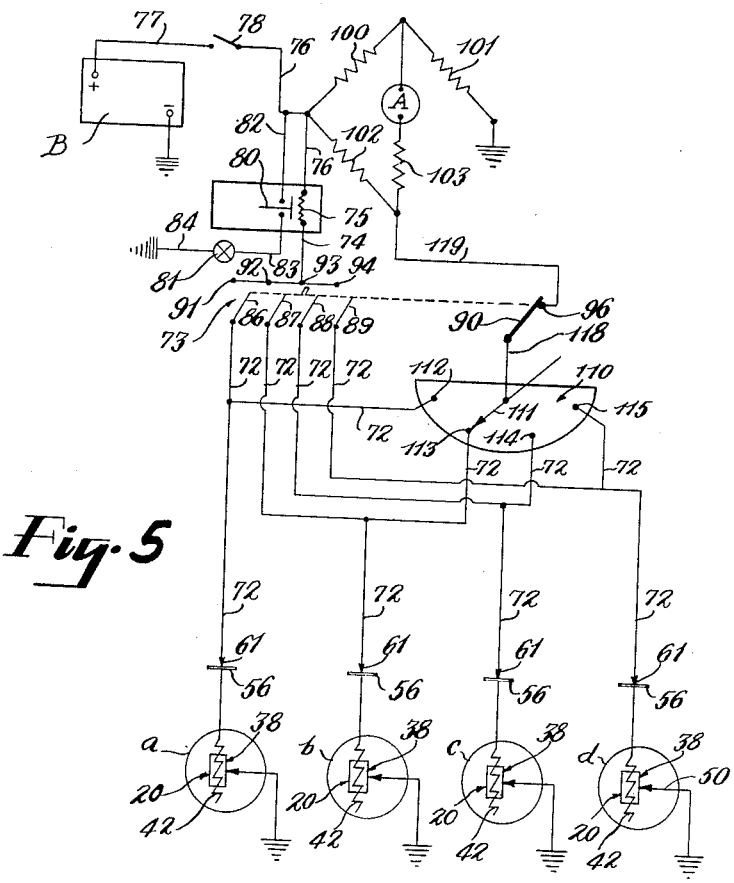
Fig. 5 is a wiring diagram of the mechanism for indicating the air pressure in a plurality of tires of an automotive vehicle, which mechanism includes a signal for indicating abnormal air pressures in the tires.

Referring to Fig. 1, a vehicle wheel W having a pneumatic tire T is mounted on the axle X of the vehicle in the usual manner. A suitable pressure responsive resistance device indicated generally at 20 is attached to the wheel and in the form shown, it comprises a metallic cylinder 21 having one end sealed by a cap 22 and the opposite end closed by an end member 23. The cap and end member may be attached to the cylinder in any suitable manner but are here shown threaded on the cylinder. The end member 23 has a nipple formation 24 and an air passage 25 therein leading from the nipple 24 to the central portion of inner face of the member to provide communication between the interior of the cylinder 21 and the interior of the tire by way of a tube 26 attached at one end to the nipple 24 and at the other end to a branch of the tire inflating stem 27. The underside of the end member 23 is bored and tapped to receive a bolt 28 by which the device is secured to a bracket 29 attached to the wheel by a stud bolt and nut 30.

Figures 6, 7:
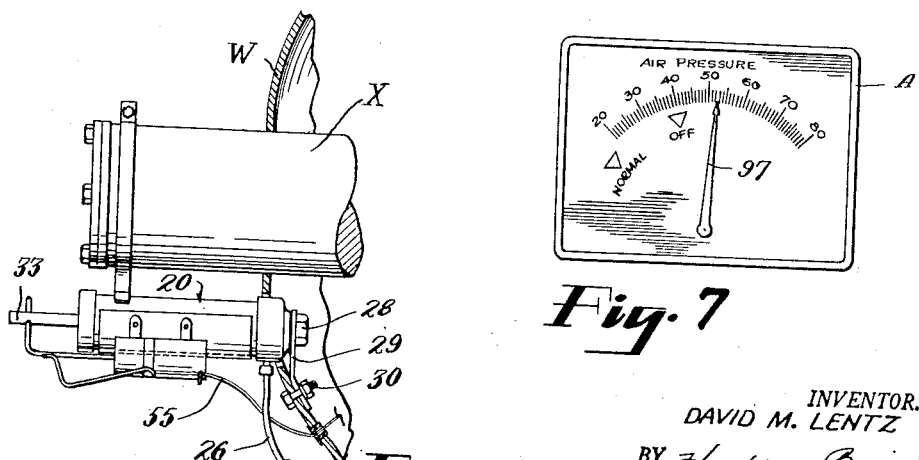
Fig. 6 is a fragmentary sectional view of a vehicle wheel and axle showing the pressure responsive electrical resistance device attached to the vehicle in an alternative manner.
Fig. 7 is an elevational view of a dial indicator for indicating air pressure in the individual tires.
Figure 8:
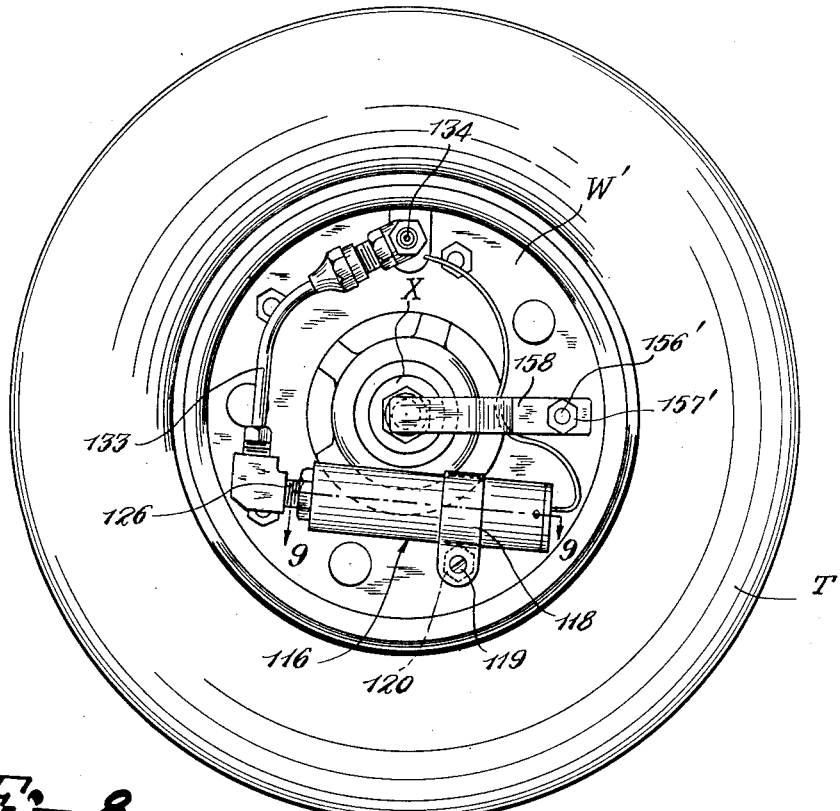
Fig. 8 is an elevational view of a vehicle wheel having another form of pressure responsive electrical resistance device mounted thereon.
Figure 9:
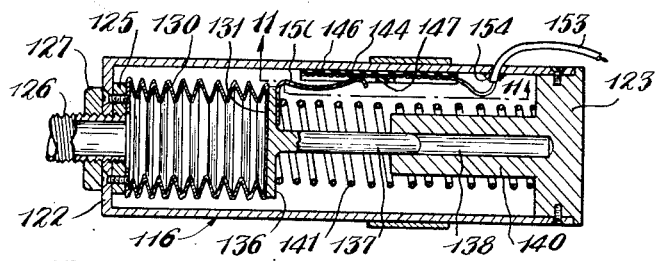
Fig. 9 is a sectional view taken substantially along line 9—9 of Fig. 8.
Figure 11:
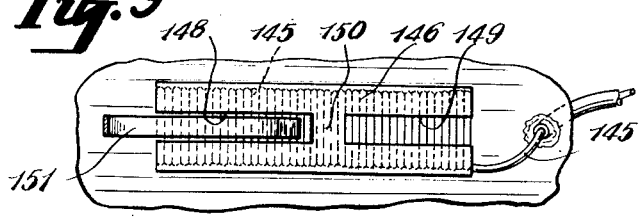
Fig. 11 is a fragmentary view taken on line 11—11 of Fig. 9.
Figure 10:
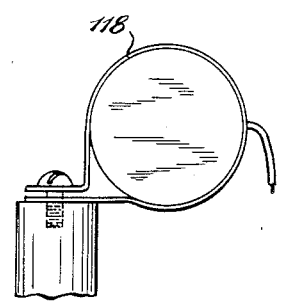
Fig. 10 is a fragmentary end elevational view of the resistance device shown in Fig. 8.

In the form shown in Fig. 1 the device 20 is mounted to one side of the axis of rotation of the wheel with the axis of the cylinder 21 extending in a plane normal to the axle X. Alternatively, the device could be mounted with the axis of cylinder 21 extending parallel to the axle as shown in Fig. 6. In either case rotation of the devices by the wheel does not cause erratic action of the various parts by centrifugal force.

A piston 32 reciprocates in the cylinder 21 and has a metallic rod 33 attached thereto which projects upwardly through an opening through cap 22. The piston 32 has a sealing ring 34 carried in a peripheral groove therein, which ring is preferably formed of resilient material, such as a suitable so-called synthetic rubber, and forms an airtight seal between the piston and cylinder. A compression spring 36 surrounds the piston rod 33 and is interposed between the piston and cap 22 to oppose movement of the piston in the upward direction, as viewed in Fig. 3. The tension of the spring is such that the position of the piston in the cylinder corresponds uniformly to the air pressure in the cylinder beneath the piston, at least over the major range of movement of the piston.

A variable electrical resistance 38 is attached to the exterior of the cylinder 21, which resistance preferably comprises a core 39 formed of a suitable dielectric material having an axial opening 40 extending therethrough, and wire 42 coiled about the core. The wire 42 is preferably embedded in insulation 43, except for a longitudinal strip of the outer surfaces of the wire coil which is bared by a gap 44 in the insulation. The gap 44 is bridged by a relatively short segment of insulation 45, the purpose of which is explained hereinafter. A terminal bolt 46 and nut 47 are provided for connecting one end of the coiled wire 42 with a circuit to be described hereinafter.

The piston rod 33 has a metallic contact carrying rod 48 attached thereto which is adapted to extend into the axial opening 40 of the core 39 and to be guided therein as the piston 32 reciprocates in the cylinder. The rod 48 has a contact 50 attached thereto which is adapted to ride in the gap 44 and to contact the exposed surfaces of the coiled wire 42 as the piston 32 moves in the cylinder. It will be seen that by connecting one end of the wire 42 and the movable contact 50 in series in an electrical circuit a variable resistance may be provided which corresponds to the air pressure in the tire to which the cylinder 21 is connected.

The spring 36 is adapted to resist upward movement of piston 32 to the extent that when the air pressure within the cylinder 21 below the piston is within a desired normal range, for example, 35 to 37 lbs., the contact 50 engages the insulating material 45 which bridges the gap 44 in the insulation 43 and thereby interrupts the circuit through the resistance device. If the pressure is above or below the normal range, the contact 50 engages the exposed portions of the coiled wire 42 and provides a resistance corresponding to the air pressure. It will be appreciated that the normal range of operation of the resistance device may be determined by the position of the insulating material 45 on the coil 42 and the limits of the range determined by the width of the material.

One end of the coiled wire 42 is connected with a source of current by a wire 55 which is attached at one end to the coil at the terminal 47, and the opposite end of which is electrically connected to a collector ring 56 attached to the wheel W, preferably inside the brake drum D. The collector ring 56 is attached to the outer wall of the drum D by bolts 57, which extend through the wheel plate and which are secured by nuts 58 threaded thereon. The ring 56 is insulated from the wheel by insulating grommets and washers 60 interposed between the ring and the brake drum and bolts 57, as shown. Current is supplied to the collector ring 56 by a brush 61 supported for longitudinal movement in a threaded tube 63 having an insulating sleeve 64 therein and which tube is attached in an opening through the inner wall 65 of the brake drum D by a pair of nuts 66 threaded on the tube and one on each side of the wall. A plug 68 is threaded into one end of the insulating sleeve 64, which plug has a terminal nut 69 threaded on the outer end thereof, and the inner end engages a compression spring 70 which urges the brush 61 outwardly and into engagement with the ring 56. A wire 72 is connected to the plug 68 by the terminal nut 69, which wire leads to a source of current, as described hereinafter.

The opposite end of the resistance coil 42 is grounded through the contact 50, metallic rods 48, 33, spring 36, cylinder 21, bracket 29, wheel W to the frame of the vehicle through the axle.

It is to be understood that each wheel of which the air pressure in the tire thereof is to be indicated, is equipped with a pressure responsive variable resistance device 20. In the embodiment shown, four devices 20 are used and are illustrated diagrammatically in Fig. 5 as mounted on wheels a, b, c, d, respectively, like reference characters indicating like parts.

The wires 72 may be connected with any suitable source of current, and are shown connected with the positive electrode of a conventional storage battery B, which supplies current for operation of the vehicle, through a circuit including a five pole, manually operable double throw switch 73, wire 74, solenoid 75, and wires 76, 77. Preferably, a switch 78 is connected in series with wires 76, 77 and is adapted to be opened and closed by the vehicle motor ignition switch mechanism as the ignition switch is opened and closed so that the mechanism is deenergized when the vehicle engine ignition is turned off.

The switch 73 preferably comprises contacts 86, 87, 88, 89, which are movable by a common operating member to engage, respectively, contacts 91, 92, 93, 94 which are all connected with wire 74. By this arrangement, all of the variable resistance devices 20 are electrically connected and disconnected with wire 74 simultaneously. Contact 90 is adapted to engage contact 96 when contacts 86, 87, 88, 89 are open and to be moved from contact 96 as the other contacts are closed, the purpose of which appears hereinafter. The switch 73 is preferably located conveniently to the operator of the vehicle, such as on the instrument panel of the vehicle.

The solenoid 75 is adapted to close a normally open contact 80 when energized by current voltages such as those of the currents through the resistance devices 20, which contact is adapted to close a circuit through a signal device, and in the form shown it is an electric lamp 81, the circuit for which lamp includes battery B, wire 77, switch 78, wires 76, 82, contact 80, wires 83, 84 to ground. The signal lamp is mounted in any suitable location in the view of the vehicle operator. As may be seen, when switch 73 is closed, the signal lamp is lighted in the event a circuit is completed through any one of the resistance coils 42 of the devices 20. As explained hereinbefore, no circuit is completed through the resistance coils unless the air pressure in the tire with which the respective devices are connected is above or below normal.

A dial indicator A is provided which is adapted to be responsive to the current potentials in the respective resistance coils 42 and to correspondingly move a hand 97 relative to suitable indicia to provide a reading in air pounds, as illustrated in Fig. 7. Preferably, the indicator is an ammeter connected in the bridge of a conventional Wheatstone bridge circuit, three arms of which are respectively formed by resistances 100, 101, 102 and the fourth arm of which can comprise any selected resistance coil 42 of the respective devices 20. As shown, ammeter A is connected between the resistances 100, 101 and 102 and the respective resistances of the devices 20. A suitable resistance 103 is provided in series with the ammeter. The indicator A is located in view of the vehicle operator, as on the instrument panel.

The resistance coils 42 of any of the devices 20 can be selectively connected in the Wheatstone circuit by a selector switch, 110 which includes a sweeping contact 111 adapted to be rotated manually to successively engage fixed contacts 112, 113, 114, 115 supported in a suitable switch housing indicated at 116. Contact 111 is connected with the Wheatstone bridge circuit through wire 118, contacts 90, 96 and wire 119. The contacts 112, 113, 114, 115 are connected with the wires 72 of the respective resistance devices 20, and by properly positioning the contact 111 the ammeter A can be made to indicate the potential in any of the resistance devices desired. The switch 110 is located convenient to the vehicle operator and indicia is provided to enable the operator to select which device 20 is to be connected in the Wheatstone circuit.

Preferably, the ammeter A is set to throw the indicator needle 97 thereof to one extremity of the dial when no current is passing through the resistance coils of the devices 20, which occurs when the tire pressures are normal, and the dial has a mark to indicate this position, as may be seen in Fig. 7. In the form shown, when the Wheatstone bridge circuit is deenergized, as by opening switch 78, the needle 97 will rest at the position marked "Off."

Normally, when the vehicle is in operation, switch 78 is closed and the switch 73 is moved to the position in which it connects the wires 72, with wire 74 thereby setting up a circuit from the positive terminal of the battery through solenoid 75, wires 72, brush 61, collector rings 56, resistance coils 42, contact arms 50, to ground. When the air pressure in all of the tires is normal, contacts 50 ride on the insulating bridges 45 rather than engaging the coils 42 and no circuit is established through any of the resistance devices. In the event the air pressure in one or more of the tires becomes abnormal, either above or below the normal pressure, the contact 50 of the device 20 involved is moved into engagement with the resistance coil 42 thereby completing a circuit through the coil and the potential of the current in the circuit will correspond to the air pressure of the tire involved. Solenoid 75 is thus energized and closes contact 80 to energize the signal lamp 81 which warns the operator of the abnormal air pressure. The operator may then move switch 73 to break the circuit through solenoid 75 and wires 72 and to close contact 90 on contact 96 to connect the Wheatstone bridge in its circuit. The operator then moves contact 111 of the selector switch 110 successively over contacts 112, 113, 114, 115 to throw the individual resistance coils 42 into the Wheatstone bridge circuit and in each case of normal tire pressure no circuit can be established through the particular coil 42 and the ammeter needle will register normal. In the event the contact 50 of the pressure responsive resistance device involved is above or below the insulator bridge 45, the circuit established through the particular coil 42 causes the ammeter needle to indicate the corresponding air pressure.

By this arrangement the vehicle operator is immediately advised by the signal light 81 of an abnormal air pressure in any one of the tires and he may immediately readily ascertain by reference to the ammeter by the selector switch which tire or tires are affected and to what extent. The mechanism is extremely simple and reliable and it is only necessary to provide but one ammeter in conjunction with the signal device, regardless of the number of tires to be checked.

It is quite common in the trucking and bus industries for a separate company or operator to contract with bus or truck operators to service and maintain the tires of the vehicles. It has been found by the tire servicing companies or operators that the tire users are frequently lax in carrying proper tire pressures and that the life of the tires is materially shortened for this reason. One of the objects of the present invention is to provide mechanism for furnishing a printed record of air pressures in the several tires of vehicles whereby the tire supply company or operator may ascertain whether or not the tires have been abused by over or under inflation, and to what extent, and thereby take steps to correct the difficulty. Also, this type of mechanism will cause the vehicle operator to pay close attention to the tires as his negligence can be readily detected by those in authority. Accordingly, I have provided a mechanism which in addition to having a signal and dial indicator such as that described hereinbefore, includes a printing mechanism adapted to print on a strip of tape a record of any abnormal air pressures which may exist from time to time in the individual tires.

The form of the invention just mentioned is shown in Figs. 8 to 13, which mechanism includes a pressure responsive resistance device 116 which is shown attached to a wheel W' having a pneumatic tire T' mounted thereon. The wheel W' is journalled on the axle X' of a vehicle in a conventional manner.

The device 116 includes a suitable cylinder 117 attached to the wheel by a strap bracket 118 which is secured to a wheel stud 119 by a nut 120. The ends of the cylinder are closed by an end wall 122 and a closure plug 123. The wall 122 has a central opening therein and a ring 125 is attached to the inside of the wall concentric with the opening therethrough. The sides of the opening and the interior of the ring are threaded to receive a tubular nipple 126 which is secured in place by a nut 127 threaded on the exterior thereof and engaging the outside of wall 122.

A suitable expansible chamber, such as a flexible metallic bellows 130, has one end attached to the ring 125 and is hermetically sealed to the ring, and the opposite end is closed by a wall 131. The interior of the bellows 130 is subjected to the air pressure within the tire T' and is connected with the tire interior by a tube 133, one end of which is connected with the tire inflating stem 134 and the other end with the nipple 126 so that the bellows expands and contracts according to air pressure within the tire T'.

A plate 136 is attached to the end wall 131 of the bellows and has a stem 137 which projects loosely into a bore 138 formed in a tubular projection 140 on the plug 123. A coil spring 141 surrounds the projection 140 and stem 137, and is interposed between the plug 123 and plate 136 to oppose expansion of the bellows 130. The opposition of the spring to expansion of the bellows is such that the movement of the bellows is proportional to the air pressure in the tire.

A strip type electrical resistance 144 is attached to the inside wall of the cylinder 117 and comprises a suitable wire 145 embedded in insulating material 146. The wire may be wrapped in coils about a flat core or it may be formed of a series of close reverse bends; in the present embodiment, it is shown in the latter form and the insulation electrically separates the adjacent segments of the wire.

The insulation 146 has two aligned gaps 148, 149 which extend longitudinally of the resistance 144 and are spaced by a bridge of insulation 150. The wire exposed in the gaps 148, 149 is bare and is adapted to make electrical contact with a movable contactor 151 which is attached to the plate 136 and moves in the gaps 148, 149 as the bellows 130 expands and contracts. The resistance 144 is positioned relative to the bellows so that when normal tire pressures exist, contact 151 rests on the insulation bridge and in the event of above normal or below normal tire pressures, the contact 151 engages the wire 145 in the gaps 149 and 148, respectively.

Wire 145 extends through an opening in the side of the cylinder 117, and is connected to a collector ring inside the brake drum of the wheel, similar to the collector ring 56 described hereinbefore. Preferably, the wire 145 is covered by suitable insulation 153 which extends inside the cylinder 117, and a suitable sealing cement 154 is interposed between the opening in the cylinder and the insulation to provide a hermetic seal. Preferably, the cylinder 117 is sealed to prevent the entrance of water, dirt, etc., however, it may be desirable in some instances to provide a breathing opening in the cylinder or to evacuate the cylinder to a certain extent.

One end of wire 145 is connected with a source of current through the collector ring, as is described hereinafter, and the opposite end is connected to the ground by way of the frame of the vehicle, which ground connection includes contact 151, plate 136, bellows 130, ring 125, cylinder 117, bracket 118 to the wheel W' and from the wheel to the axle through a strip contactor 158 attached at one end to one of the wheel studs 156 and nut 157. The opposite end of the strip engages the axle which is of course connected with the frame through the springs of the vehicle, not shown. By providing the strip 158, the ground circuit does not include the bearings of the wheel which bearings might interfere with the circuit and which might be subjected to deleterious electrolytic action by current passing therethrough.

Referring now to Fig. 12, the wiring diagram for the mechanism is shown to include pressure responsive resistance devices 116 each associated with one of the respective four tires of the vehicle. It is to be understood that more or fewer devices could be provided, depending upon the number of tires desired to be checked by the mechanism.

Each of the resistance wires 145 is connected with the positive terminal of the battery B' through the respective collector rings 56, brushes 62 and wires 72, which latter wires are connected to the contacts 160, 161, 162, 163, respectively, of a rotary switch mechanism 165, which mechanism has a sweeping contact 166 adapted to be rotated and successively sweep the fixed contacts. Contact 166 is in the circuit of a solenoid 167, which is adapted to close a normally open contactor 168 when the solenoid is energized, and which solenoid circuit includes a wire 171 and contact 170. Contact 170 is normally closed and is connected to a resistance 102' of a Wheatstone bridge which is similar to the Wheatstone bridge shown in Fig.

5, and corresponding parts having corresponding reference numerals with a prime added thereto. The resistance 102' is connected with the positive electrode of the battery B' by wire 172, switch 173, which is similar to switch 78 described hereinbefore and which is opened and closed when the motor ignition switch of the vehicle is opened and closed respectively, and wire 174.

By this arrangement it will be seen that by rotating the switch contact 166 the respective resistance coils 145 are successively connected in the Wheatstone bridge circuit and alternately form the fourth arm of the circuit. Rotation of the contact 166 is effected by means to be described hereinafter.

The bridge of the Wheatstone circuit shown includes an electrical current potential responsive recorder R, which may be any suitable type of commercially available instrument having a galvanometer controlled mechanism adapted to record variations in relatively small potentials. A suitable instrument for this purpose is that known as the Micromax Model S, manufactured by Leeds and Northrup Company, Philadelphia, Pennsylvania, and shown in catalog N-33A, 1949, issued by that company. This instrument includes a sealable housing having a roll or tape of recording paper P mounted therein by mechanism which slowly feeds the paper in alignment with a marking device which is positioned to move laterally of the paper according to the potential balance existing in the bridge. The paper P is suitably lined to indicate normal pressures and a range of tire pressures. The marking device is preferably arranged to print a dot on the paper to correspond to tire pressures above or below normal and to print a numeral or other indicia alongside the dots to indicate which tire pressure is represented by the respective dots. In the form shown, the dots are identified by numerals corresponding to the respective lines, as shown.

One terminal of the galvanometer of the recorder R is connected to a terminal 176 of the Wheatstone bridge by wire 177 and the other terminal of the galvanometer is connected to a bridge terminal 178 through wire 179, contactor 180 and wire 181. The power for operating the recorder R is supplied thereto by a circuit comprising wire 184, which is connected to the battery by way of wire 172, switch 173, wire 174 and ground 185. The recorder includes an electric motor, not shown, which drives the feeding mechanism for the recording strip P and also drives the contact 166 to rotate the same, preferably at approximately 1 R. P. M. The speed of rotation of contact 166, however, could be of any convenient speed desired.

It will be seen that during normal operation of the mechanism the circuits of resistance coils 145 are individually connected in the bridge circuit once each minute and the recorder R prints a mark according to the potential in the resistance coil, which potential is a function of the air pressure in the tire involved. In the event no current is passing through the coil due to the contact 151 riding on the insulating bridge 150, the recorder R will indicate normal tire pressure.

In the event that the air pressure in any tire is above or below normal, the recorder R will record by printing on the strip the exact pressure, and at the same time solenoid 167 is energized to close contact 168 which establishes a circuit from the battery through wires 174, 172, 186 to lamp 89' and to ground, which lamp indicates to the vehicle operator the existence of an abnormal air pressure.

Preferably, provision is made whereby the operator may selectively check on the individual tire pressures by referring to an ammeter A'. The ammeter A' is like the ammeter A and can be selectively connected in the bridge circuit by a switch contact 190 which is adapted to close a circuit from bridge terminal 178 through the ammeter and a wire 191 to bridge terminal 176. Contact 190 is connected to an operating member 193 to which contacts 170 and 180 are also connected. Any one of the resistances 145 may then be set up as the fourth arm of the bridge by a selector switch S' which has a manually movable contact 195 connected to the bridge terminal 176 by a wire 196, which wire includes a suitable resistance 197 corresponding to the resistance of solenoid 167. The switch S' includes four contacts 200, 201, 202 and 203 which contacts are connected to the respective wires 72, and by rotating contact 195, the individual resistances 145 can be selectively connected in the Wheatstone bridge circuit whereby the ammeter A' will indicate whether or not the pressures are normal, and if abnormal the exact pressures.

As mentioned previously, the casing of the recorder R is preferably adapted to be sealed or locked so that the record of the tire pressures is available only to an authorized person for inspection. It will be seen that the invention provides relatively inexpensive and reliable means for accurately recording abnormal air pressures in a plurality of vehicle tires and at the same time provides a warning by which the vehicle operator can be immediately apprised of a faulty tire and an indication of the particular tire and the exact air pressure therein so that the seriousness of the situation can be judged at once and without the necessity of stopping the vehicle.

By providing a printed record of the tire pressures, the vehicle operator will be made more aware of the necessity for maintaining proper inflation of the truck tires and the tire supplier has accurate information as to possible abuse of the tires by improper inflation thereof.

While in its preferred form, the invention is employed to indicate the air pressure in vehicle tires, it will be appreciated that the invention could be embodied in systems or mechanisms for indicating fluid pressures in fluid containers other than tires. For example, the invention could be employed to provide a check on pressures within either stationary or moving vats, tanks, boilers and the like, such as those employed for processing various types of materials, or for indicating temperatures by mechanically connecting the movable contact of the resistance devices with suitable thermal responsive elements, such as a bellows filled with thermal responsive fluid.

Having thus described my invention, I claim:

1. In combination with a plurality of pressurized containers; a source of electric current, an electric circuit connected to said source; a separate means operatively associated with each container and adapted to be electrically connected with said circuit and responsive to the pressure in the respective container and each provided with cooperating elements that regulate the current flow value through the respective separate means and said circuit in correlation to the pressure in the respective container when such pressure is above or below a predetermined pressure range but interrupt current flow therethrough when the pressure in the respective container is within said predetermined range; a signal circuit connected to said electric circuit, a single electrically responsive signal device included in said signal circuit, means for automatically completing said signal circuit and energizing said single device in response to a current flow through any of said separate means and said electric circuit thus warning of the existence in at least one of the containers of a pressure which is above or below said predetermined pressure range; a single indicating device connected to said electric circuit and adapted to show the current value flowing through said electric circuit and any of said separate means and calibrated in terms of pressure, and selecting means included in said electric circuit for selectively connecting said single indicating device with the individual separate means whereby when said signal device is energized said selecting means enables determination of the particular container wherein the pressure is above or below the predetermined pressure range.

2. The combination defined in claim 1 and including switch means for connecting said separate means to said electric circuit, an indicating circuit connected to said electric circuit and containing said single indicating device, switch means in said indicating circuit to open and close the same, and a selector switch means connected to said indicating circuit and all of said separate means and enabling the latter to be selectively connected into the indicating circuit, said first named switch means being rendered ineffective when said indicating circuit is closed by the switch means therein.

3. The combination defined in claim 2 and including an electrical recording mechanism connected to said electric circuit and automatically recording the pressures in said containers when the same are above or below said predetermined pressure range provided said first named switch means is effective to connect said separate means with said electric circuit.

4. The combination defined in claim 3 and wherein said first named switch means is automatically operated by said recording mechanism and successively and automatically connects said separate means with said electric circuit.

5. In combination with a plurality of pressurized containers; separate devices corresponding in number to said containers, with one such device operatively associated with each container, said devices being responsive to the pressures in the respective containers; an electric circuit, a source of electrical energy connected to said circuit, parallel circuits corresponding in number to said separate devices and each including one of said devices, a first switch means for connecting said parallel circuits to said electric circuit, each device being provided with cooperating elements that effect current flow through the respective separate device and the parallel circuit containing the same and said electric circuit when said first switch means is closed of a value correlated to the pressure in the respective container when such pressure is above or below a predetermined pressure range but interrupt current flow therethrough when the pressure in the respective container is within said predetermined range; a signal circuit connected to said electric circuit and parallel thereto and containing a single signal device, said electric circuit and said signal circuit having cooperating means for automatically closing said signal circuit and energizing said single signal device in response to a current flow through any of said separate devices, the parallel circuits containing the same, and said electric circuit but automatically opening said signal circuit when there is no current flow therethrough; and indicating circuit connected to said electric circuit and containing a single indicating device adapted to show the current value flowing through said indicating circuit and calibrated in terms of pressure, a selector switch electrically connected to each of said parallel circuits and said separate devices, and means electrically connecting said indicating circuit and said selector switch and including a switch adapted to be open when said first named switch is effective and closed when said first named switch is ineffective.

6. The combination defined in claim 5 and wherein said first switch means and said switch in the means for electrically connecting said indicating circuit and said selector switch are articulated such that closing of said first switch means opens said switch and vice versa.

7. The combination defined in claim 5 and wherein the cooperating means for automatically closing said signal circuit includes a solenoid in said electric circuit and a normally open contactor in said signal circuit that is closed when said solenoid is energized by current flow through said electric circuit.

8. The combination defined in claim 5 and wherein an electrical recording mechanism is connected to said electric circuit and automatically records the pressures in said containers when the same are above or below said predetermined pressure range provided said first switch means is effective to connect said parallel circuits with said electric circuit.

9. The combination defined in claim 8 and wherein said first switch means is automatically operated by said recording mechanism and includes spaced contacts connected to said parallel circuits and a sweeping contact arm successively engaging said spaced contacts.

DAVID M. LENTZ.

References Cited in the file of this patent

UNITED STATES PATENTS

| Number | Name | Date |
|---|---|---|
| 1,954,153 | Taylor | Apr. 10, 1934 |
| 2,248,047 | Addy et al. | July 8, 1941 |
| 2,270,148 | Stowe | Jan. 13, 1942 |
| 2,353,428 | Akin | July 11, 1944 |
| 2,423,340 | Pelleterre | July 1, 1947 |
| 2,423,609 | Middleton et al. | July 8, 1947 |
| 2,439,092 | Lindstrom | Apr. 6, 1948 |
| 2,443,252 | Kelly | July 15, 1948 |
| 2,550,041 | Cozzolino et al. | Apr. 24, 1951 |
| 2,593,224 | Utterback et al. | Apr. 15, 1952 |

FOREIGN PATENTS

| Number | Country | Date |
|---|---|---|
| 553,821 | Great Britain | June 7, 1943 |